(12) United States Patent
Clarke et al.

(10) Patent No.: US 10,356,008 B2
(45) Date of Patent: Jul. 16, 2019

(54) LARGE SCALE FABRIC ATTACHED ARCHITECTURE

(71) Applicant: International Business Machines Corporation, Armonk, NY (US)

(72) Inventors: Kevin Clarke, Westford, MA (US); Jeffrey Bloom, Bellingham, MA (US); John Considine, Hollis, NH (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 15/635,319

(22) Filed: Jun. 28, 2017

(65) Prior Publication Data

US 2019/0007341 A1 Jan. 3, 2019

(51) Int. Cl.
*H04L 12/935* (2013.01)
*H04L 12/46* (2006.01)
(Continued)

(52) U.S. Cl.
CPC .............. *H04L 49/30* (2013.01); *H04L 12/46* (2013.01); *H04L 49/352* (2013.01); *H04L 67/10* (2013.01); *H04L 45/02* (2013.01); *H04L 49/356* (2013.01)

(58) Field of Classification Search
CPC ......... H04L 45/02; H04L 12/46; H04L 67/10; H04L 49/352; H04L 49/356; H04L 67/1097; H04L 49/00; H04L 49/10; H04L 49/15; H04L 49/25; H04L 49/252; H04L 49/35; H04L 49/351; H04L 49/70; H04L 45/00; H04L 45/01; H04L 45/16; H04L 45/44; H04L 45/74; H04L 45/754; H04L 41/12; H04L 12/00; H04L 12/28; H04L 12/2801; H04L 12/54; H04L 12/56; G06F 9/5072; G06F 9/5077; G06F 2009/45575; G06F 2009/45579; G06F 2009/45583;
(Continued)

(56) References Cited

U.S. PATENT DOCUMENTS 6,230,252 B1 5/2001 Passint et al.
6,970,941 B1\* 11/2005 Caronni .............. H04L 12/4679
709/227

(Continued)

FOREIGN PATENT DOCUMENTS

CN 103501242 A 1/2014
WO 98017043 A2 4/1998

OTHER PUBLICATIONS

Mell et al., "The NIST Definition of Cloud Computing," U.S. Department of Commerce, National Institute of Standards and Technology, Special Publication 800-145, Gaithersburg, MD, Sep. 2011, pp. 1-7.

(Continued)

*Primary Examiner* — Maharishi V Khirodhar
*Assistant Examiner* — Kenneth P Hunt
(74) *Attorney, Agent, or Firm* — Stosch Sabo

(57) ABSTRACT

A plurality of fabric controllers distributed throughout a fabric attached architecture and each associated with at least one resource node. The plurality of fabric controllers configured to control each associated resource node. Resources of the resource nodes are utilized in virtual environments responsive to respective fabric controllers issuing instructions received from the fabric attached architecture to respective resource nodes.

14 Claims, 11 Drawing Sheets

(51) Int. Cl.
*H04L 29/08* (2006.01)
*H04L 12/931* (2013.01)
*H04L 12/751* (2013.01)

(58) Field of Classification Search
CPC . G06F 2009/45595; G06F 2009/45566; G06F 2009/4557; G06F 2009/45587; G06F 2009/45592; G06F 9/45533–45558; G06F 2009/45562–45595
USPC .......................................................... 370/351
See application file for complete search history.

(56) References Cited

U.S. PATENT DOCUMENTS

| | | | |
|---|---|---|---|
| 7,243,142 | B2 | 7/2007 | Poirot et al. |
| 8,209,395 | B2 | 6/2012 | Richoux |
| 8,667,049 | B2 | 3/2014 | Blumrich et al. |
| 8,774,625 | B2 | 7/2014 | Binkert et al. |
| 8,797,843 | B2 | 8/2014 | Kamath et al. |
| 9,124,959 | B2 | 9/2015 | Xu et al. |
| 9,143,338 | B2 | 9/2015 | Fricker |
| 9,325,604 | B2 | 4/2016 | Li et al. |
| 9,442,786 | B2 | 9/2016 | Singh et al. |
| 9,531,596 | B2 | 12/2016 | Volpe et al. |
| 10,088,643 | B1 * | 10/2018 | Allen-Ware ............. H04Q 1/13 |
| 2006/0117208 | A1 * | 6/2006 | Davidson ............ H04L 67/1008 714/4.2 |
| 2007/0253437 | A1 | 11/2007 | Radhakrishnan et al. |
| 2011/0307715 | A1 | 12/2011 | Diab |
| 2013/0322838 | A1 | 12/2013 | Julien et al. |
| 2014/0006815 | A1 | 1/2014 | Castro-Leon et al. |
| 2014/0149715 | A1 | 5/2014 | Inman |
| 2014/0185611 | A1 * | 7/2014 | Lie .......................... H04L 49/25 370/355 |
| 2014/0188996 | A1 | 7/2014 | Lie et al. |
| 2014/0304398 | A1 * | 10/2014 | Carlen ................... H04L 65/80 709/224 |
| 2015/0055952 | A1 | 2/2015 | Younce et al. |
| 2015/0098700 | A1 | 4/2015 | Zhu et al. |
| 2015/0237421 | A1 | 8/2015 | Morgan et al. |
| 2015/0304233 | A1 * | 10/2015 | Krishnamurthy ..... H04L 47/762 709/226 |
| 2016/0070282 | A1 | 3/2016 | Chapel et al. |
| 2016/0072761 | A1 * | 3/2016 | Shih .................... H04L 61/2015 709/220 |
| 2016/0077570 | A1 | 3/2016 | Varadarajan et al. |
| 2016/0210261 | A1 * | 7/2016 | Oprea ...................... H04Q 1/13 |
| 2016/0323037 | A1 | 11/2016 | Leigh et al. |
| 2016/0335209 | A1 | 11/2016 | Jau et al. |
| 2016/0380895 | A1 | 12/2016 | Xiong et al. |
| 2017/0054524 | A1 | 2/2017 | Gumaste et al. |
| 2018/0054353 | A1 * | 2/2018 | Hanson ............... H04L 67/1097 |
| 2018/0323989 | A1 * | 11/2018 | Akhtar ................ H04L 12/1831 |

OTHER PUBLICATIONS

Ajima et al., "Tofu: A 6D Mesh/Torus Interconnect for Exascale Computers," Computer, IEEE Computer Society, vol. 42, Issue 11, 2009, pp. 36-40.
Cray, "Cray Xt3 Datasheet," Cray XT3™ Supercomputer Scalable by Design, © 2005 Cray, Inc., 6 pgs.
Punhani, et al., "A Modified Diagonal Mesh Interconnection Network," 2014 Annual IEEE India Conference (INDICON), © 2014 IEEE, pp. 1-6.
Tang et al., "Diagonal and Toroidal Mesh Networks," IEEE Transactions on Computers, vol. 43, No. 7, Jul. 1994, pp. 815-826.
Leroux et al., "New Developments on Tore Supra Data Acquisition Units", WEPMN020, Proceedings of ICALEPCS2011, Grenoble, France, Copyright © 2011, pp. 922-925.
Dockès et al., "30.8. Diskless Operation with PXE Chapter 30. Advanced Networking", https://www.freebsd.org/doc/handbook/network-diskless.html, C. (2017), pp. 1-7.

\* cited by examiner

3D TORUS FABRIC
300

LARGE SCALE FABRIC ATTACHED ARCHITECTURE

BACKGROUND

The present disclosure relates to large scale system integration, and, more specifically, to generating, managing, and utilizing a fabric attached architecture.

A fabric attached architecture can be a set of directly and indirectly connected computational resources. Fabric attached architectures can be utilized for various computational workloads. For example, fabric attached architectures can perform high performance computing (HPC) functions that are not practical on a general purpose computer. As another example, fabric attached architectures can provide custom virtual resources on an as-needed basis.

SUMMARY

Aspects of the present disclosure are directed to a method comprising detecting a plurality of communicatively coupled resource nodes forming at least a portion of a fabric attached architecture. Respective resource nodes of the plurality of resource nodes can comprise a respective baseboard management controller (BMC) and can further comprise at least one of storage capability and compute capability. The plurality of resource nodes can be respectively coupled with a plurality of fabric controllers. The method can further comprise providing resource node capability information of a first resource associated with a first resource node of the plurality of resource nodes to the fabric attached architecture according to a fabric protocol responsive to a first fabric controller interfacing with the first resource node via a first BMC associated with the first resource node. The method can further comprise utilizing the first resource in a virtual machine generated on the fabric attached architecture responsive to the first fabric controller issuing instructions associated with the virtual machine to the first resource node.

Aspects of the present disclosure are further directed to a system comprising a plurality of resource nodes communicatively coupled to one another to form at least a portion of a fabric attached architecture, wherein respective resource nodes of the plurality of resource nodes have at least one of compute capability and data storage capability. The plurality of resource nodes can include a first resource node comprising a baseboard management controller (BMC) and a first resource. The system can further comprise a plurality of fabric controllers respectively coupled to the plurality of resource nodes. The plurality of fabric controllers can include a first fabric controller communicatively coupled to the BMC and comprising a fabric processor, a switch, and a storage. The fabric processor can execute instructions stored in the storage to interface with the first resource node via the BMC and provide resource capability information of the first resource via the switch to the fabric attached architecture according to a fabric protocol. The fabric controller can be configured to utilize the first resource by sending instructions to the first resource node in response to receiving virtual machine information from the fabric attached architecture via the switch.

Aspects of the present disclosure are further directed toward a computer program product comprising a computer readable storage medium having program instructions embodied therewith. The computer readable storage medium may not be a transitory signal per se. The program instructions can be executed by a processor and cause the processor to perform a method comprising detecting, by a first fabric controller, a first resource node communicatively coupled to the first fabric controller. The first resource node can comprise a first baseboard management controller (BMC) and a first resource. The method can further comprise detecting, by the first fabric controller, a plurality of fabric controllers communicatively coupled to the first fabric controller and forming at least a portion of a fabric attached architecture. Respective fabric controllers of the plurality of fabric controllers can be associated with respective resource nodes. The method can further comprise providing, by the first fabric controller, resource node capability information about the first resource to the fabric attached architecture according to a fabric protocol responsive to detecting the plurality of fabric controllers and interfacing with the first resource node via the first BMC. The method can further comprise utilizing the first resource by sending instructions to the first resource node responsive to receiving virtual machine information from the fabric attached architecture.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
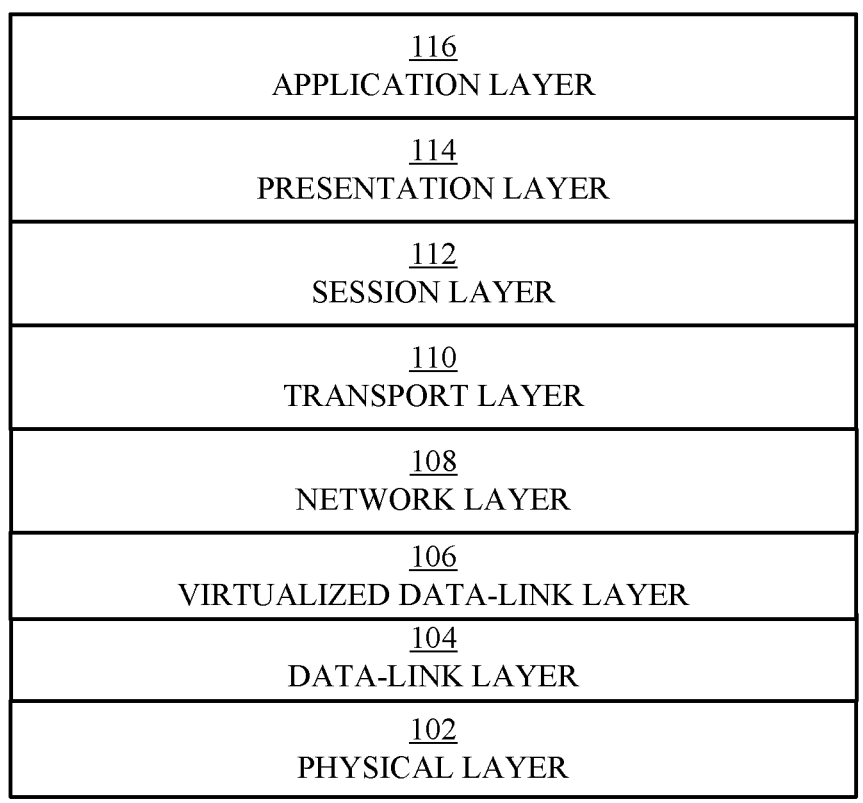
FIG. 1 depicts layers associated with a fabric attached architecture abstraction layer model in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward large scale system integration, and, more specifically, to generating, managing, and utilizing a fabric attached architecture.

Embodiments of the present disclosure combine resource nodes by high speed interconnects to create a fabric attached architecture providing high performance and cost effective virtual resources.

Typically, data switching in a fabric attached architecture occurs using a hierarchy of top-of-rack (TOR) switches, aggregation switches, and/or management switches. TOR switches can be connected to one or more racks. Disadvantageously, if any TOR switch fails in a typical fabric architecture, an entire rack of resources is rendered inoperable. Furthermore, TOR switches can limit data flow path redundancy and fault tolerance. Thus, a heavily utilized rack may experiences latencies associated with an overused TOR switch. Likewise, a failed TOR switch may require inefficient rerouting of a significant number of data packets through the fabric architecture to avoid the failed TOR switch.

Embodiments of the present disclosure overcome the challenges of traditional fabric architectures by associating each resource node in the fabric attached architecture with a switch and other hardware (collectively referred to as a fabric controller in the present disclosure). Thus, embodiments of the present disclosure exhibit a high degree of fault tolerance (e.g., any single switch failure renders one and only one resource node inoperable) and a high degree of data flow path redundancy (e.g., a data flow can be rerouted around any inoperable switch, and, in most cases, with minimal or no noticeable delays associated with the rerouting).

Traditional fabric attached architectures have failed to pursue attaching a switch to each resource node because such a configuration would result in unacceptable latencies during virtual computing. However, embodiments of the present disclosure overcome such challenges by utilizing high speed interconnects (e.g., 600 gigabit per second (GBPS) internode data transfer rates) and an efficient fabric topology (e.g., a topology conceptually represented as a torus).

Embodiments of the present disclosure can realize a variety of advantages as a result of associating a fabric controller with each resource node and interconnecting the fabric attached architecture by high speed interconnects such as increased fault tolerance and increased data flow path redundancy.

In addition, and in accordance with some embodiments of the present disclosure, the plurality of distributed fabric controllers improve the functioning of the fabric attached architecture by integrating various types, families, brands, versions, and/or generations of resource nodes into the fabric attached architecture by individually interfacing with each resource node via a designated fabric controller implementing a fabric protocol. Thus, according to some embodiments of the present disclosure, traditionally incompatible physical resources can be combined (e.g., in a same rack) to provide customized, cost-effective virtual resources satisfying diverse customer needs.

In some embodiments, fabric controllers can provide resource node capability information of their associated resource node to the fabric attached architecture via a control interface and according to a fabric protocol implemented on a virtualized data-link layer. The virtualized data-link layer can encapsulate a physical connection protocol and an associated control protocol in a single entity. The virtualized data-link layer can assign virtual addresses to each paired resource node and fabric controller in the fabric attached architecture to manage, control, improve, and/or secure data flow throughout the fabric attached architecture.

Advantageously, and in accordance with some embodiments of the present disclosure, the virtualized data-link layer improves functioning of the fabric attached architecture by, for example, simplifying (e.g., by organized virtual addresses) and/or controlling (e.g., by traffic shaping logic) data flows throughout the fabric attached architecture.

Furthermore, and in accordance with some embodiments of the present disclosure, the virtualized data-link layer improves functioning of the fabric attached architecture by, for example, enabling selective partitioning of the fabric attached architecture according to the virtual addressing into customized virtual resources satisfying diverse customer needs (e.g., providing both multi-tenant virtual resources and single-tenant physical (bare metal) resources to various customers).

Furthermore, and in accordance with some embodiments of the present disclosure, the virtualized data-link layer improves functioning of the fabric attached architecture by, for example, enabling control of any resource from a variety of vantages such as, but not limited to, performance, capability, security posture, and/or lifecycle management.

The aforementioned advantages related to the distributed fabric controllers and the virtualized data-link layer are example advantages, and embodiments of the present disclosure exist that contain all, some, or none of the aforementioned advantages while remaining within the spirit and scope of the present disclosure.

FIG. 1 illustrates layers associated with a fabric attached architecture abstraction layer model (ALM) 100 in accordance with some embodiments of the present disclosure. The fabric attached architecture ALM 100 includes physical layer 102 physically connecting a plurality of nodes, data link layer 104 providing node-to-node data transfer, network layer 108 providing procedures for transferring data throughout a network, transport layer 110 providing procedures for transferring data from a source to a host via a network, session layer 112 providing control for connections between computers, presentation layer 114 establishing context between application-layer entities, and application layer 116 interacting directly with a user and a software application.

Aspects of the present disclosure generate virtualized data-link layer 106 based on data-link layer 104 according to a fabric protocol stored in, and implemented by, a plurality of fabric controllers distributed throughout a fabric attached architecture.

Virtualized data-link layer 106 can provide a unified protocol for node-to-node communication between a variety of similar and dissimilar resource nodes (e.g., different families of products, different generations of products, etc.) via a fabric controller associated with each node. Virtualized data-link layer 106 can be used to provide resource capability information associated with various resource nodes to the fabric attached architecture via a control interface of the fabric attached architecture. Virtualized data-link layer 106 can include virtual addressing for resource nodes and fabric controllers associated with the fabric attached architecture.

Advantageously, virtualized data-link layer 106 can provide intelligent flow control of data packets throughout the fabric attached architecture using the virtual addressing and logic stored in the plurality of fabric controllers. Additionally, virtualized data-link layer 106 allows custom configuration of network layer 108 according to unique customer needs. In some embodiments, aspects of virtualized data-link layer 106 are generated and used based on instructions stored in a fabric protocol in a fabric controller.

Figure 2:
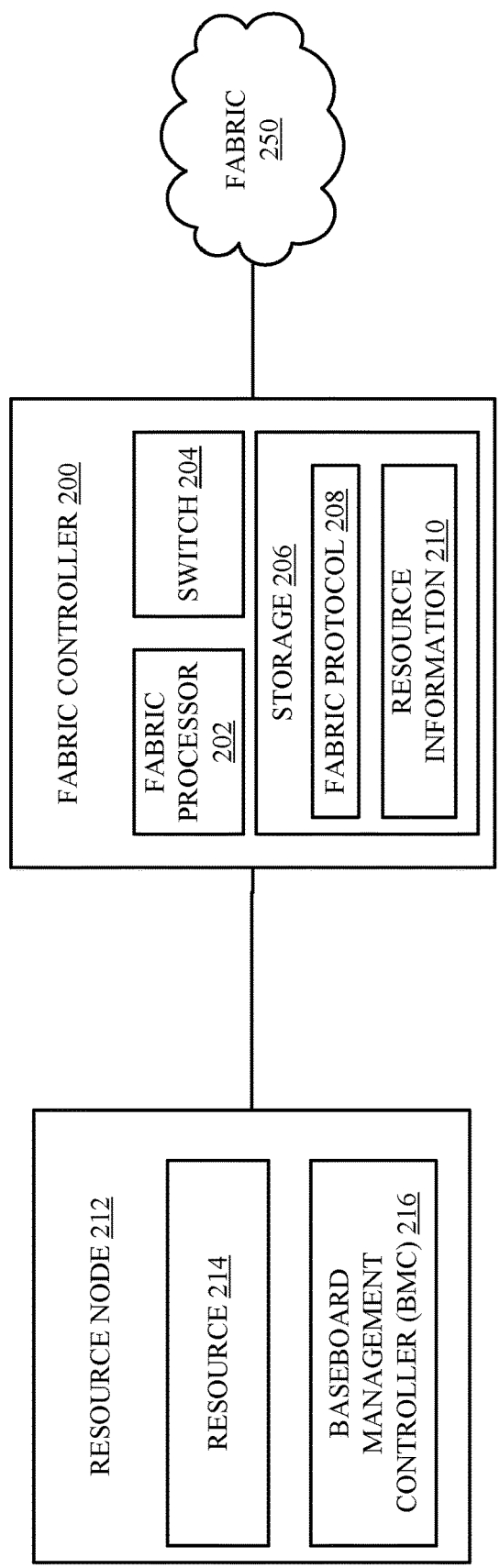
FIG. 2 illustrates a block diagram of an example paired fabric controller and resource node in accordance with some embodiments of the present disclosure.

FIG. 2 illustrates aspects of a fabric controller in accordance with some embodiments of the present disclosure. A plurality of fabric controllers can be connected to a plurality of resource nodes to form a fabric attached architecture in accordance with some embodiments of the present disclosure. In some embodiments, fabric controller 200 performs operations using virtualized data-link layer 106 of FIG. 1. Fabric controller 200 can be, but is not limited to, an embedded computer system, a system on chip (SoC), a system in package (SiP), a single-board computer (SBC), a computer-on-module (COM), a system-on-module (SOM), a single-host controller, or a mutli-host controller. In some embodiments, fabric controller 200 can be a Qseven module. Fabric controller 200 can contain fabric processor 202, switch 204, and storage 206.

Fabric processor 202 can be any one of numerous processors such as, but not limited to, a central processing unit (CPU), a multi-core processor, a front-end processor, a microprocessor, an application-specific instruction set processor (ASIP), an application-specific integrated circuit (ASIC), or a different kind of processor integrated into fabric controller 200 and capable of executing computer program instructions.

Switch 204 can be a switch configured to interconnect a plurality of resource nodes 212 (described in more detail below) together in a fabric 250. Switch 204 can be configured to selectively forward data to other switches associated with other fabric controllers interconnected in the fabric 250.

In various embodiments, switch 204 can include a plurality of Ethernet ports and/or a plurality of Peripheral Component Interconnect Express (PCIe) ports. In some embodiments, switch 204 is an Ethernet-based switch. In some embodiments, switch 204 is a single-host controller. In some embodiments, switch 204 is a multi-host controller. In some embodiments, switch 204 is an Intel Ethernet Controller FM10000 Series product.

In some embodiments, switch 204 is connected to a management network (e.g., a control plane management network for inter-service communications) of the fabric 250. In some embodiments, switch 204 is connected to the management network via an Ethernet connection (e.g., a one gigabit Ethernet connection).

Storage 206 can be static or dynamic storage in various embodiments. In some embodiments, storage 206 is a flash storage. In some embodiments, storage 206 is a 16 gigabyte (GB) M4 flash storage.

Storage 206 stores fabric protocol 208 and resource information 210. Fabric protocol 208 comprises processor-executable instructions for fabric controller 200 to detect fabric 250, detect resource 214 associated with resource node 212, interface with resource 214 of resource node 212, provide resource capability information associated with resource 214 to the fabric 250, and selectively forward data packets throughout the fabric attached architecture having virtual addresses defined by a virtualized data-link layer (e.g., virtualized data-link layer 306 of FIG. 3).

In some embodiments, storage 206 stores virtual address information for at least a portion of the fabric attached architecture in a ternary content addressable memory (TCAM). In some embodiments, the TCAM additionally contains physical addresses corresponding to six fabric controllers directly connected to fabric controller 200.

Resource information 210 provides processor-executable instructions for interfacing with resource node 212. Resource information 210 can contain any necessary firmware and/or software for interfacing with various families, types, generations, and/or versions of resources such that the fabric controller 200 can control the resource 214.

Storage 206 can receive software updates and/or firmware updates to fabric protocol 208 and/or resource information 210. As will be appreciated by one skilled in the art, individual fabric controllers can contain a standardized set of resource information 210, or individual fabric controllers can contain different sets of resource information 210 based on different types, families, generations, and/or versions of resource nodes that interface with respective fabric controllers.

Fabric controller 200 is communicatively coupled to a resource node 212. In some embodiments, fabric controller 200 and resource node 212 reside in a same sled of a rack (e.g., a same interchangeable unit in a server rack).

Resource node 212 contains resource 214 and BMC 216. Resource 214 can comprise, alone or in combination, storage resources, computational resources, processing resources, or other resources that can be utilized as virtual resources by the fabric 250. In some embodiments, resource 214 comprises only one of storage resources or computational resources.

BMC 216 can be a processor configured to monitor and interface with resource node 212 using one or more sensors (not shown) measuring variables relevant to performance such as, but not limited to, temperature, humidity, various power/voltage/current measurements, cooling parameters (e.g., fan speed), and/or communications parameters. In some embodiments, BMC 216 comprises a microcontroller embedded in a motherboard of resource node 212. In some embodiments, fabric controller 200 interfaces with resource node 212 via BMC 216 (e.g., to perform power-on sequences, to perform basic configurations, and/or to retrieve a media access control address).

In some embodiments, resource node 212 is utilized according to instructions received from the fabric 250 via fabric controller 200. In some embodiments, BMC 216 is directly connected to fabric processor 202 via a RS-232 serial port communicating data according to the RS-232 serial communication transmission protocol. In some embodiments, BMC 216 is also connected to, or alternatively connected to, fabric controller 200 via a one gigabit Ethernet connection.

Fabric 250 can comprise a plurality of resource nodes 212 (also referred to herein as physical resources and/or resources). The plurality of resource nodes 212 can provide diverse capabilities to the fabric 250. In some embodiments, the resource nodes 212 comprise different resources (e.g., compute resources, storage resources, networking resources, etc.), different families of similar products (e.g., different brands of storage resources), and/or different generations of one product (e.g., legacy systems). Resource capability information can be provided to the fabric 250 by a fabric controller 200 associated with a resource node 212. Resource capability information can indicate performance characteristics (e.g., storage size, processing speed, etc.) available on each resource node 212. Fabric 250 can use resource capability information to utilize appropriate resource nodes 212 as virtual resources.

Fabric controller 200 can be embedded within, adjacent to, or distant from resource node 212 in various embodiments so long as fabric controller 200 is communicatively coupled to resource node 212 and fabric 250. In some embodiments, one fabric controller is associated with each resource node in the fabric 250 such that there are an equal number of fabric controllers and resource nodes. However, as will be appreciated by one skilled in the art, a plurality of fabric controllers could be distributed throughout the fabric attached architecture such that each fabric controller is associated with more than one resource node (e.g., each fabric controller associated with two resource nodes) while remaining within the spirit and scope of the present disclosure.

Although fabric controller 200 is shown including separate elements such as fabric processor 202, switch 204, and storage 206, fabric controller 200 can likewise have one or more of those separate elements integrated within one another or communicatively coupled to fabric controller 200 rather than embedded within the fabric controller 200. For example, fabric processor 202 could actually reside in switch 204. In another example, storage 206 could actually be communicatively coupled to fabric controller 200 rather than being embedded within fabric controller 200.

Figure 3:
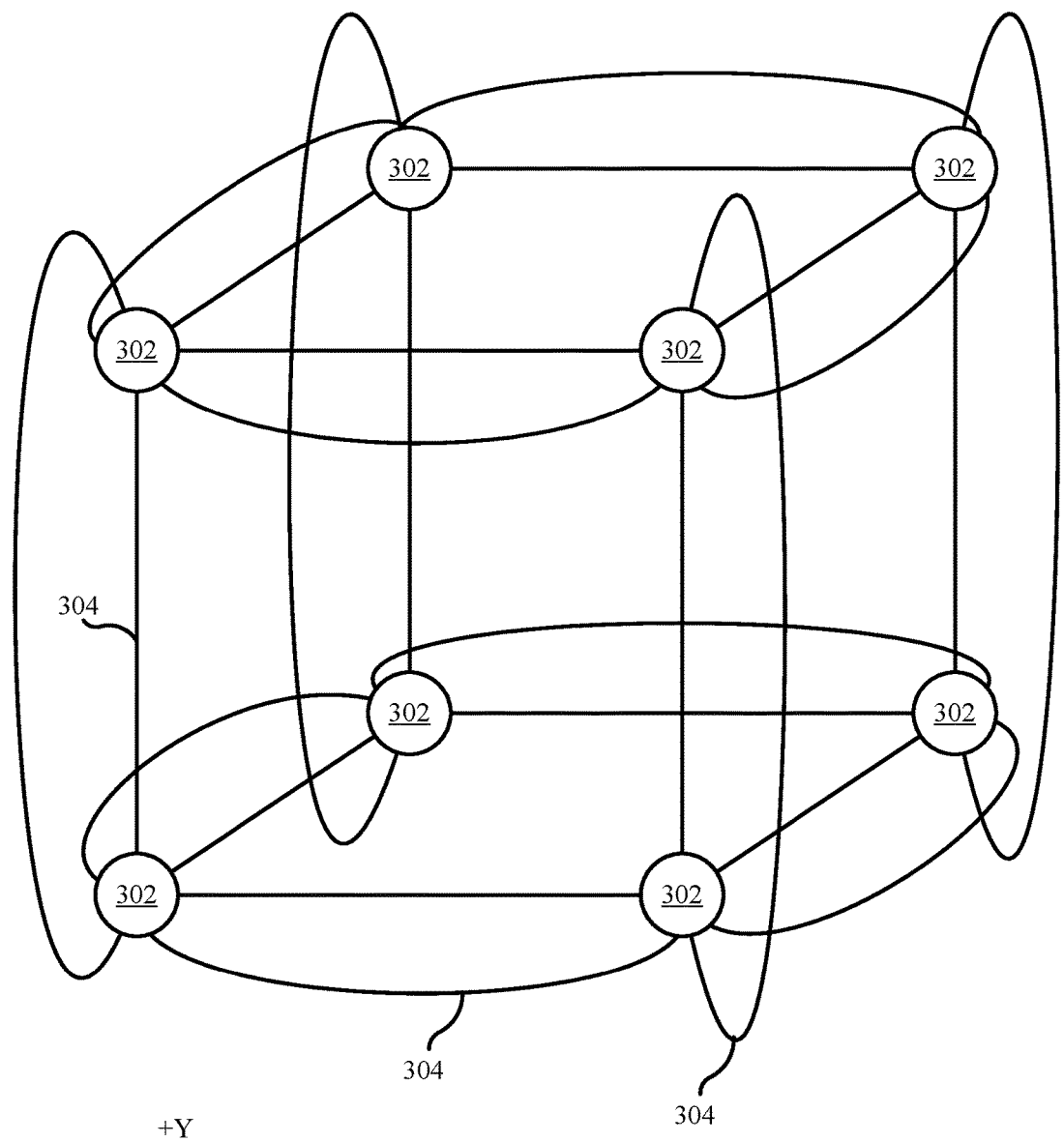
FIG. 3 illustrates an exemplary network topology for a distributed computing system, in accordance with embodiments of the present disclosure.
Figure 3:
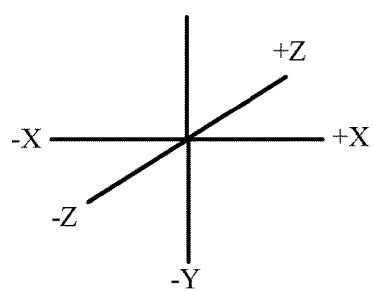

FIG. 3 illustrates an exemplary network topology 300 (e.g., a 3D torus fabric) for a distributed computing system, in accordance with embodiments of the present disclosure. In the example shown in FIG. 3, the topology is represented as a 3-dimensional lattice, with each circle representing a cabled node 302. The nodes 302 may include, but are not limited to, server computers, storage systems, management entities, other computer systems, or any combination thereof. The lines connecting nodes 302 represent cables 304 between the cabled nodes 302. In some embodiments, the cables 304 may be optical fiber cables.

In some embodiments, cables 304 comprise Ethernet connections. In embodiments where cables 304 comprise Ethernet connections, individual Ethernet connections can be rated for 100 gigabit per second (Gbps) performance. As can be seen in FIG. 3, in some embodiments, each node 302 is connected to six adjacent nodes in a torus structure via six cables 304. Thus, in embodiments utilizing 100 Gbps Ethernet connections in a torus structure, the network topology 300 (e.g., 3D torus fabric) can be rated for 600 Gbps internode connectivity.

In some embodiments, network topology 300 is rated for larger or smaller internode connectivity such that the network topology 300 exhibits appropriately low latency during operation. In some embodiments, a larger number of nodes 302 may utilize cables 304 rated for higher speeds than previously described to reduce potential latency. In some embodiments, network topology 300 can be arranged in alternative configurations that could utilize cables 304 rated for higher or lower data transfer rates than previously described based on the alternative conceptual configuration of the fabric attached architecture.

In some embodiments, the internode connectivity speed is sufficient to realize latencies of less than 25 microseconds (e.g., intra pod latency). In some embodiments, the internode connectivity speed is at least approximately 100 Gbps, 200 Gbps, 300 Gbps, 400 Gbps, 500 Gbps, or 600 Gbps. In some embodiments, the internode connectivity speed is a rated internode connectivity speed. In some embodiments, the internode connectivity speed is a measured internode connectivity speed. In some embodiments, rated and measured internode connectivity speeds are associated with manufacturing tolerances and measurement tolerances such that although a single number is indicated (e.g., 600 Gbps), a range of numbers is implied (e.g., 500-700 Gbps, 550-650 Gbps, or 590-610 Gbps).

In some embodiments, the nodes 302 comprise different resources (e.g., compute resources, storage resources, networking resources, etc.), different families of similar products (e.g., different brands of storage resources), and/or different generations of one product (e.g., legacy systems) that are presented to a fabric attached architecture according to a fabric protocol.

In some embodiments, cables 304 can be configured to accommodate alternative connections such as, but not limited to, Fibre Channel connections, Asynchronous Transfer Mode connections, and/or InfiniBand connections.

Although network topology 300 is shown in as a torus structure, the fabric can also be configured in numerous alternative arrangements such as, but not limited to, a diagonal mesh (e.g., a three-dimensional diagonal mesh) or a multi-link mesh (MLM) (e.g., a three-dimensional MLM).

As can be seen in FIG. 3, the distributed computing system may be arranged using a 3D torus topology. It is to be understood in advance that the 3-D torus topology shown in FIG. 3 is a visual representation of the topology and communicative connections between nodes, and is not intended to show the actual physical arrangement of nodes (e.g., on a board or within a rack) and/or cables. Accordingly, the cables between nodes do not necessarily represent actual cables (e.g., physical cables that are connected to each node), but rather represent a communicative connection between nodes. As such, the present disclosure should not be limited to the arrangement of nodes and/or cables shown in FIG. 3.

Within the topology, each node 302 has six cables 304, one for each of the positive X, Y, and Z directions, and one for each of the negative X, Y, and Z directions. Outer-most cabled nodes 302, such as nodes located on edges of the network topology 300, will have one or more "wrap-around" cables 304 that connect the node to nodes on the opposite side of the network topology 300. For example, a node 302 that sits at the end of the network topology 300 in the +X direction will have a wrap-around cable 304 that connects it to a node that sits at the end of the network topology 300 in the −X direction. Likewise, corner nodes 302 will have three wrap-around cables 304, one for each of the X, Y, and Z directions.

While the network topology 300 in FIG. 3 is shown with eight nodes 302 arranged in a 2×2×2 arrangement, any number of nodes otherwise consistent with this disclosure is contemplated. In some embodiments, the network topology 300 may include more nodes (e.g., at least 5,000 nodes or at least 16,000 nodes), and the nodes may be arranged with unbalanced directionality. In other words, the nodes may be arranged as an N×N×N (e.g., cubic) 3D torus fabric, where the number of nodes in each direction is identical as shown in the example in FIG. 3. In other embodiments, the nodes may be arranged in a 3D torus fabric where the number of nodes in a particular direction differs from the number of nodes in a different direction (e.g., a 22×24×10 fabric).

While the network topology 300 shows a 3D torus fabric having a plurality of nodes 302 physically connected to each other such that each node 302 has 6 direct connections (e.g., cables 304) to neighboring nodes 302, as will be understood by a person of ordinary skill in the art, embodiments of the present disclosure may not have any nodes directly connected to each other. Instead, various embodiments of the present disclosure may include one or more shuffle boxes that are directly connected to the nodes (e.g., using pigtails)

and to other shuffle boxes. Shuffle boxes may be connected such that the nodes are arranged in a 3D torus configuration.

Figure 4:
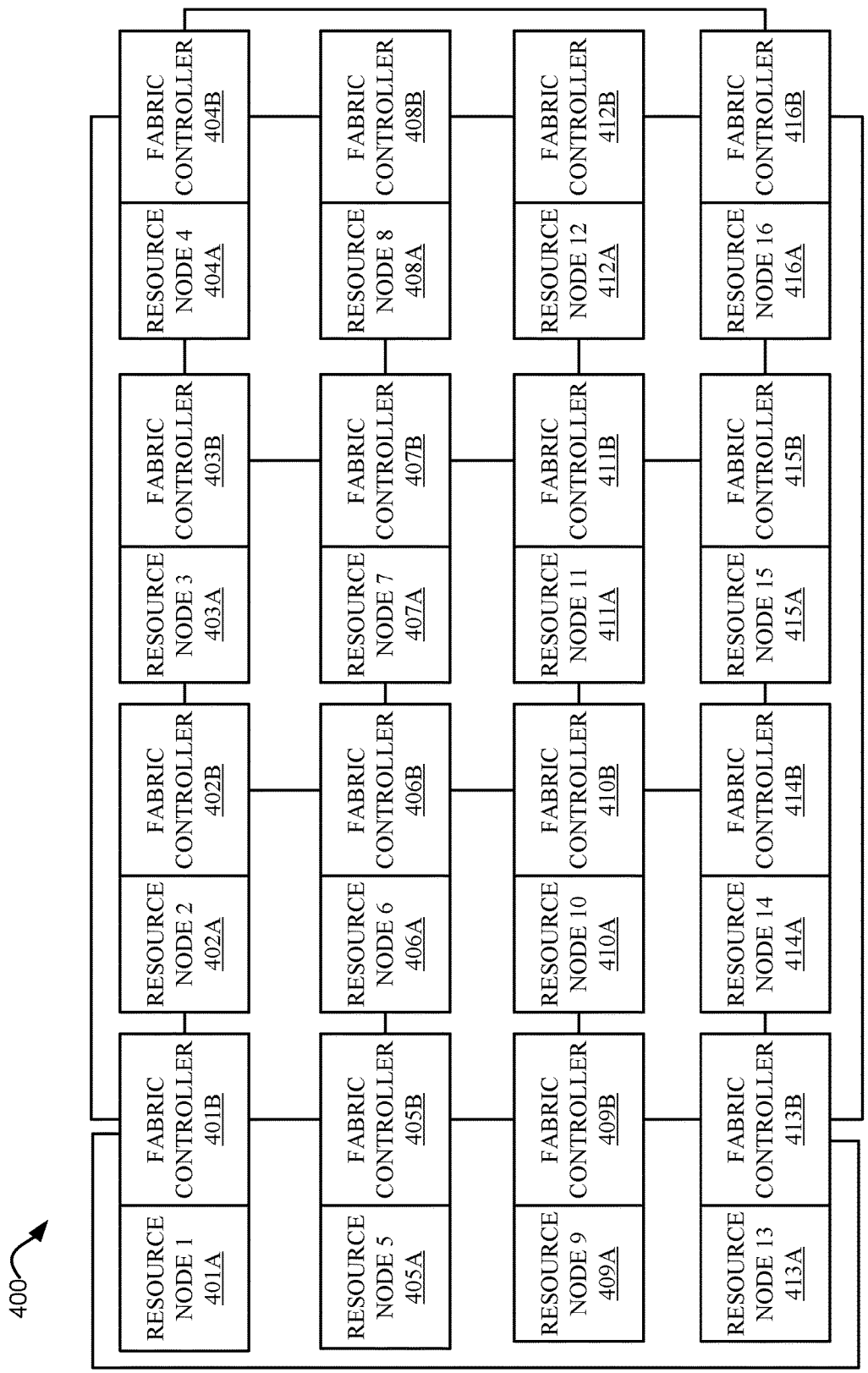
FIG. 4 illustrates a block diagram of an example single layer of interconnected nodes in accordance with some embodiments of the present disclosure.

FIG. 4 illustrates a block diagram of a single layer of physically interconnected nodes in accordance with some embodiments of the present disclosure. Interconnected layer of nodes 400 can be, for example, a single layer of nodes 302 from network topology 300 illustrated with respect to FIG. 3. However, in a typical embodiment, a third dimension (e.g., the z-dimension orthogonal to the "plane" illustrated in FIG. 4) may include additional nodes. Thus, although FIG. 4 illustrates each node directly connected to four other nodes, when implemented, each node can be connected to six other nodes by accounting for two additional connections in the z-dimension. Interconnected layer of nodes 400 can include resource nodes 401A-416A and associated fabric controllers 401B-416B. For simplicity, respective pairs of resource nodes and fabric controllers may hereinafter be referred to collectively as nodes (e.g., node 1 referring to both resource node 401A and fabric controller 401B).

Fabric controllers 401B-416B can provide resource capability information of their respective resource nodes 401A-416A to the fabric attached architecture via a virtualized data-link layer (e.g., virtualized data-link layer 106) responsive to executing instructions stored in a fabric protocol (e.g., fabric protocol 208 of FIG. 2).

In some embodiments, each fabric controller 401B-416B and corresponding node 401A-416A can be associated with a virtual address defined according to a virtualized data link layer (e.g., virtualized data-link layer 106 of FIG. 1). Data packets distributed throughout the fabric attached architecture for managing virtual machines implemented on the fabric attached architecture can be associated with virtual addresses and selectively forwarded by respective fabric controllers 401B-416B according to instructions stored in each fabric controller 401B-416B, information retrieved by each fabric controller about the fabric attached architecture, and information stored within the data packets.

For example, a data packet (described in further detail hereinafter with respect to FIG. 5A) can be sent from fabric controller 4 404B to fabric controller 6 406B via the fabric attached architecture. In such an example, fabric controller 404B can receive the data packet and select a preferred route from numerous possible routes. For example, fabric controller 404B can select route {3, 2, 6} (i.e., fabric controller 403B, fabric controller 402B, fabric controller 406B) from a variety of possible routes (e.g., alternative routes of equal distance could be {3, 7, 6}, {8, 7, 6}, and {1, 5, 6}).

Fabric controller 404B can select the route based on any number of factors such as, but not limited to, a priority associated with the data packet or other data packet information related to routing decisions, flow congestion data, quality of service (QoS) considerations, node and interconnect health, and so on. Fabric controller 404B can make such determinations based on instructions stored within the fabric controller (e.g., fabric protocol 208 of FIG. 2), information stored in the data packet, and/or information received from the fabric attached architecture.

In some embodiments, fabric controller 404B is configured to execute instructions monitoring path information for at least a portion of the nodes in the fabric attached architecture at recurring intervals (e.g., at every one-second interval) to identify possible and/or preferred routes (e.g., shortest routes identified based on Dijkstra's algorithm).

In some embodiments, fabric controller 404B is configured to execute instructions for iterative packet switching (e.g., [−1,+1] packet switching) such that data packets are selectively forwarded to an adjacent fabric controller having a virtual address more similar to a destination virtual address than fabric controller 404B.

Thus, in some embodiments, fabric controller 404B does not determine an entirety of a route but rather determines a next step (e.g., a next "hop") within the route. For example, fabric controller 404B could send a data packet with a destination of node 6 406A to fabric controller 403B and allow fabric controller 403B to determine a next hop for the data packet according to any updated information received by fabric controller 403B.

Thus, aspects of the present disclosure utilizing distributed fabric controllers with each fabric controller coupled to one and only one resource node enable significant fault tolerance by providing path redundancy throughout the fabric attached architecture. This will be readily apparent at scale, when, instead of 16 nodes as illustrated in FIG. 4, there are thousands or tens of thousands of interconnected nodes. Thus, according to some embodiments of the present disclosure, an inoperable fabric controller will only render a single node inoperable (as compared to a traditional management switch failure or top-of-rack (TOR) switch failure which can render an entire rack of resources or section of resources unavailable). Furthermore, even with an inoperable fabric controller, data packets are readily re-routable throughout the fabric attached architecture with minimal or no delays (e.g., there are typically alternative routes avoiding any inoperable fabric controller of equal distance as the route(s) utilizing the inoperable fabric controller).

Figure 5A:
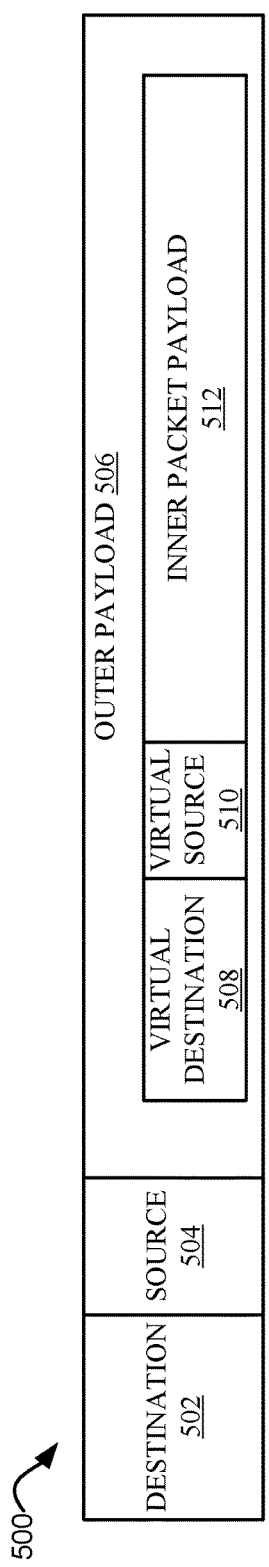
FIG. 5A illustrates a block diagram of an example data packet according to some embodiments of the present disclosure.

FIG. 5A illustrates an example data packet according to some embodiments of the present disclosure. Data packet 500 can contain a physical destination 502, a physical source 504, and an outer payload 506. Data packet 500 can further comprise a virtual destination 508, a virtual source 510, and an inner packet payload 512.

In some embodiments, physical destination 502 and physical source 504 are associated with a traditional data-link layer (e.g., data-link layer 104 of FIG. 1), and virtual destination 508 and virtual source 510 are associated with a virtualized data-link layer (e.g., virtualized data-link layer 106 of FIG. 1). Thus, virtual destination 508 and virtual source 510 can comprise virtual addresses assigned to a resource node and/or fabric controller as part of the virtualized data-link layer. In some embodiments, inner packet payload 512 can be associated with virtual machine information. In some embodiments, inner packet payload 512 contains layer 3 traffic (e.g., IPv4 or IPv6 traffic). In some embodiments, inner packet payload 512 is decapsulated at usage upon arriving at virtual destination 508.

Virtualized addresses can be created according to a data center identifier (ID), a rack ID, a chassis ID, and a fabric controller ID. Thus, each virtual address can be represented as a 4-tuple of data. In some embodiments, virtual addresses are represented in 48 bits. In some embodiments, virtual addresses are media access control (MAC) addresses or are similar to MAC addresses.

Data center IDs can include information such as, but not limited to, alone or in combination, a building, a room, a metropolitan area (e.g., MZone), a fault zone (e.g., FZone), and/or a quality of service (QoS) zone (e.g., QZone).

Rack IDs can include an identifier of a rack or enclosure containing a plurality of interchangeable sets of resources. In some embodiments, 9 bits of the virtual address are used to identify a rack ID.

Chassis IDs can include an identifier of a portion of a rack. In some embodiments, a chassis comprises a physically interchangeable unit of a rack. In some embodiments, chassis and sled are interchangeable terms. In some embodiments, 7 or fewer bits of the virtual address are used to identify a chassis ID.

Fabric controller IDs can identify a particular fabric controller in a chassis or sled of a rack.

Figure 5B:
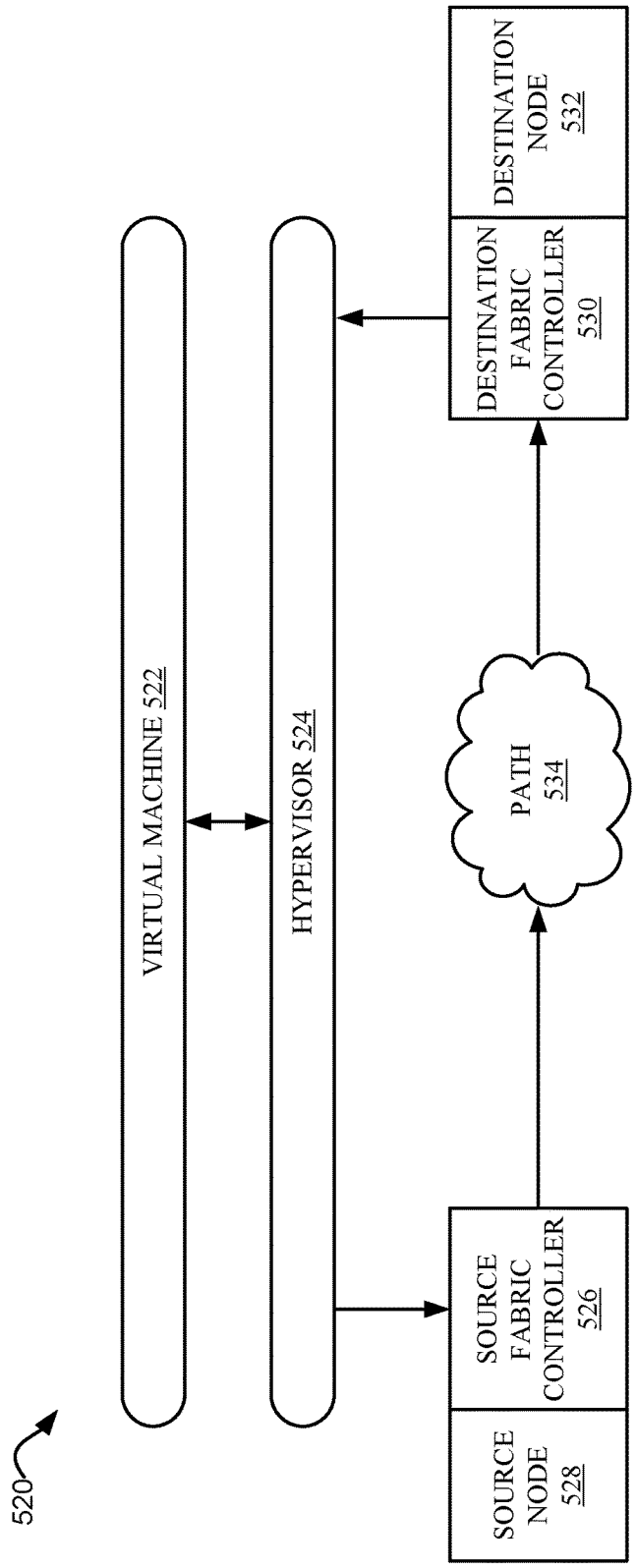
FIG. 5B illustrates an example data flow according to some embodiments of the present disclosure.

FIG. 5B illustrates an example data flow 520 according to some embodiments of the present disclosure. Data packet 500 can be generated by virtual machine 522 associated with hypervisor 524 and transmitted to a source fabric controller 526 associated with a source node 528. Source fabric controller 526 can identify virtual destination 508 associated with destination fabric controller 530 and identify at least a portion of an appropriate path 534 to destination fabric controller 530 based on logic stored in source fabric controller 526 (e.g., fabric protocol 208 of FIG. 2).

Appropriate path 534 can be determined based on iterative data packet switching or intelligent flow control logic. Data packet switching can be [−1,+1] path selection based on the virtual address of the fabric controller processing the traffic and the virtual address of the destination fabric controller 530 (e.g., each fabric controller can send the data packet to an adjacent fabric controller having a virtual address closer to the virtual address of the destination fabric controller 530 based on the 4-tuple of data associated with the virtual destination 508). In some embodiments, skip optimizations are utilized such that a more efficient route (e.g., a shorter, non-sequential route) is identified and utilized.

Destination fabric controller 530 receives data packet 500 and transmits data packet 500 to virtual machine 522 via hypervisor 524 together with any utilized resources associated with destination node 532 as indicated in inner packet payload 512.

Although the same virtual machine 522 and hypervisor 524 are described with respect to FIG. 5B, in some embodiments, data flows 520 may travel between different virtual machines and, in some cases, different hypervisors.

Figure 6:
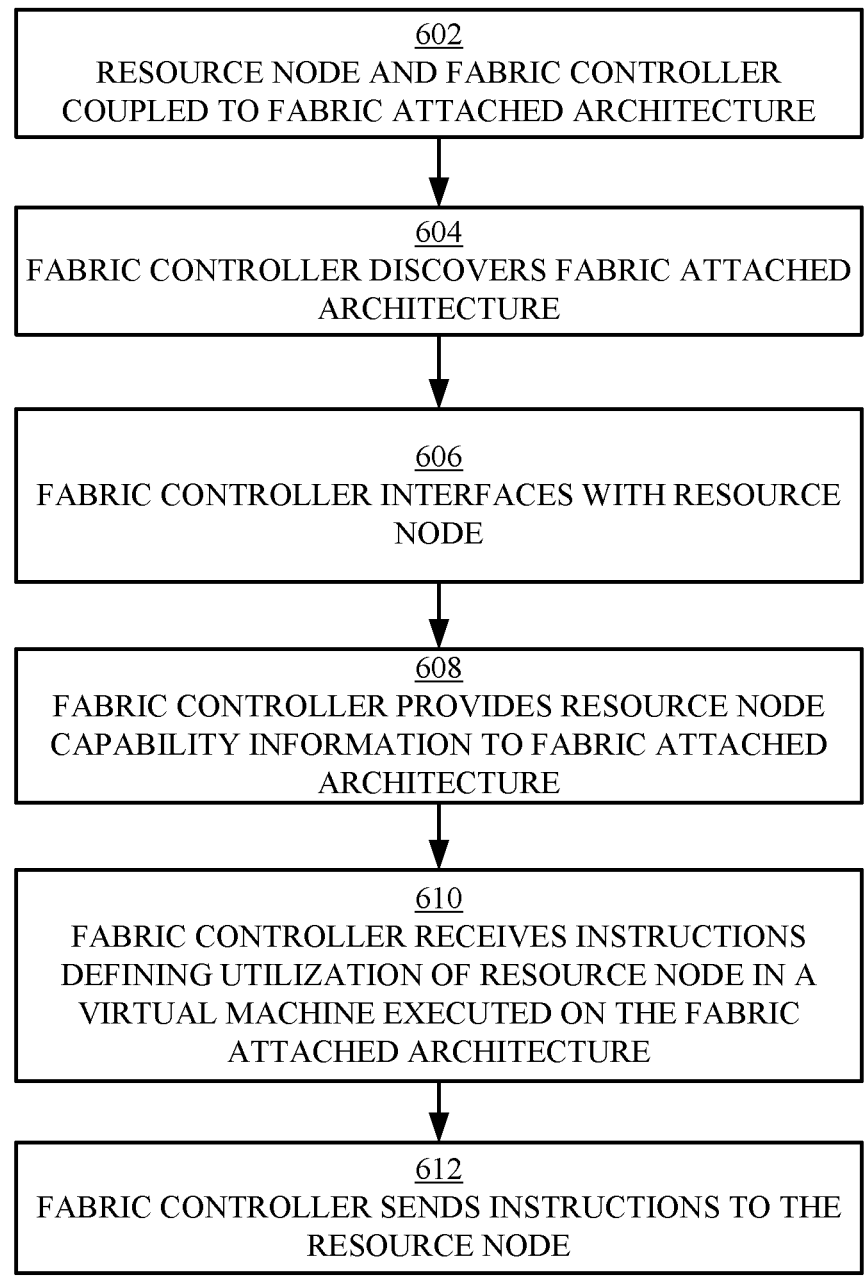
FIG. 6 illustrates an example flowchart for adding a node to a fabric attached architecture in accordance with some embodiments of the present disclosure.

FIG. 6 illustrates an example flowchart for adding a node to a fabric attached architecture in accordance with some embodiments of the present disclosure. In some embodiments, the method 600 can be executed by a fabric controller (e.g., fabric controller 200 of FIG. 2) connected to at least one resource node (e.g., resource node 212 of FIG. 2). In some embodiments, the method 600 is executed by a processor executing computer-readable instructions stored in a computer-readable storage medium. For consistency, the method 600 will hereinafter be described as being executed by a fabric controller 200, however, as will be appreciated by one of skill in the art, alternative components or combinations of components can likewise perform aspects of the method 600.

In operation 602, a resource node 212 and an associated fabric controller 200 are coupled to a fabric attached architecture 250. In some embodiments, the resource node 212 and associated fabric controller 200 comprise a sled (e.g., an interchangeable unit of a rack). Operation 602 can comprise physically connecting the resource node 212 and associated fabric controller 200 to the fabric attached architecture 250 (e.g., by Ethernet connection) and supplying power to the resource node 212 and associated fabric controller 200.

In some embodiments, the fabric attached architecture 250 comprises a plurality of resource nodes 212 directly and indirectly connected to one another via physical connections such as, but not limited to, Ethernet connections. In some embodiments, each resource node of the plurality of resource nodes are connected to six other resource nodes in a torus topology with each connection comprising a 100 GBPS Ethernet connection such that each resource node exhibits internode connectivity speeds of approximately 600 GBPS. In some embodiments, respective resource nodes 212 in the fabric attached architecture 250 have compute capabilities, storage capabilities, networking capabilities, and/or other capabilities. In some embodiments, respective resource nodes 212 in the fabric attached architecture 250 have one and only one of storage capability or compute capability. In some embodiments, one fabric controller 200 is associated with each resource node 212. One of skill in the art will recognize alternative arrangements exist which fall within the spirit and scope of the present disclosure (e.g., two resource nodes 212 associated with each fabric controller 200).

In operation 604, the fabric controller 200 discovers other fabric controllers and/or resource nodes in the fabric attached architecture 250 by executing instructions stored in a storage 206 (e.g., a flash memory) of the fabric controller 200 and via messages sent and/or received from a management network (e.g., a control plane management network) associated with the fabric attached architecture 250. In some embodiments, fabric controller 200 discovers other nodes in the fabric attached architecture 250 using the Intermediate System—Intermediate System (IS-IS) protocol. In operation 604, the fabric controller 200 receives any required information for successfully connecting its associated resource node 212 to the fabric attached architecture 250 such as, but not limited to, virtual addresses of other nodes in the fabric attached architecture. In some embodiments, operation 604 comprises establishing virtual addresses in a virtualized data-link layer 106 for the fabric controller 200 and its resource node 212.

In various embodiments, the fabric controller 200 and its resource node 212 are configured to have identical virtual addresses or virtual addresses that are sequential to one another. In some embodiments, fabric controller 200 retrieves a media access control (MAC) address from the BMC 216 and sets the MAC address of BMC 216 as the MAC address of the fabric controller 200. In some embodiments, the virtualized addresses are 48-bit addresses including 9 bits dedicated to identifying a rack and 7 or fewer bits dedicated to identifying at least a chassis or sled within the rack. In some embodiments, the virtualized addresses are configured to identify at least a data center, a rack, a chassis, and a fabric controller.

In operation 604, the resource node 212 can successfully complete a power-on-self-test (POST) before entering a busy-wait status until instructions are received from the fabric controller 200. In some embodiments, the resource node 212 is not provided with sufficient software and/or firmware to fully boot without additional resources provided by the fabric controller 200 or without additional resources provided by the fabric attached architecture 250 and transmitted to the resource node 212 via the fabric controller 200. In some embodiments, the fabric controller 200 is provided with instructions stored in a storage 206 of the fabric controller 200 to prevent the resource node 212 from fully booting and/or detecting the fabric attached architecture 250 until allowed to do so by the fabric controller 200.

In operation 606, the fabric controller 200 interfaces with the resource node 212. The fabric controller 200 can execute instructions, firmware, and/or software stored as resource information 210 in a storage 206 of the fabric controller 200 to successfully interface with the BMC 216 of the resource node 212. In some embodiments, the fabric controller 200 is configured to utilize the resource node 212 such that the resources 214 (e.g., storage resources, computation resources, etc.) of the resource node 212 can be utilized in a virtual environment according to instructions sent from fabric controller 200 to resource node 212. Once the fabric controller 200 and the resource node 212 are appropriately configured to function in the fabric attached architecture 250, the resource node 212 is allowed to fully boot.

In operation 608, the fabric controller 200 provides resource node capability information associated with its connected resource node 212 to the fabric attached architecture 250. Resource node capability information can be, but is not limited to, hardware capabilities (e.g., storage space and type of storage space, processing speed, etc.) associated with resources 214 on resource node 212. In some embodiments, the resource node capability information is provided to the fabric attached architecture 250 via a control plane of the fabric attached architecture 250. In some embodiments, the resource node capability information is collected and provided to the fabric attached architecture 250 based on instructions stored in fabric protocol 208.

In operation 610, the fabric controller 200 receives instructions from the fabric attached architecture 250 for utilization of resource node 212 in a virtual environment, such as a virtual computing environment and/or virtual storage environment. The instructions received by the fabric controller 200 in operation 610 can be received from, or associated with, a virtual machine, a hypervisor, or an administrator, such as a fabric manager (described in more detail hereinafter with respect to FIG. 8).

In operation 612, the fabric controller 200 implements the received utilization instructions by issuing instructions to its resource node 212, and the resource node 212 is utilized in a virtual environment.

Figure 7:
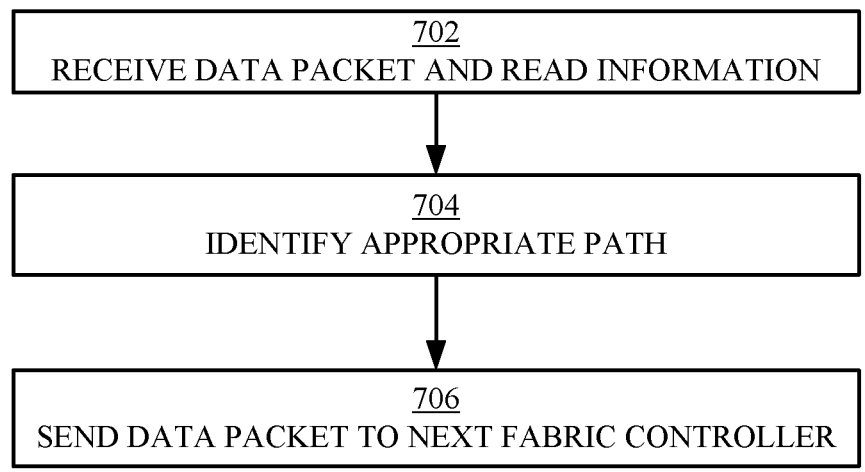
FIG. 7 illustrates an example flowchart for transmitting data packets through a fabric attached architecture in accordance with some embodiments of the present disclosure.

FIG. 7 illustrates an example flowchart for transmitting data packets through a fabric attached architecture in accordance with some embodiments of the present disclosure. In some embodiments, the method 700 can be executed by a fabric controller (e.g., fabric controller 200 of FIG. 2). In some embodiments, the method 700 is executed by a processor executing computer-readable instructions stored in a computer-readable storage medium. For consistency, the method 700 will hereinafter be described as being executed by a fabric controller 200, however, as will be appreciated by one of skill in the art, alternative components or combinations of components can likewise perform aspects of the method 700.

In operation 702, a fabric controller 200 receives a data packet, such as data packet 500 discussed above, and identifies the destination of the data packet. In some embodiments, the fabric controller identifies the destination by a virtual destination address, such as virtual destination address 508, associated with a virtualized data-link layer, such as virtualized data-link layer 106, implemented on the fabric attached architecture 250.

If the fabric controller 200 receiving the data packet in operation 702 is a source fabric controller, such as source fabric controller 526, then the data packet is received from a virtual machine, such as virtual machine 522, via a hypervisor, such as hypervisor 524, utilizing, at least in part, resources of the source node, such as source node 528, associated with the source fabric controller.

In operation 704, the fabric controller 200 identifies an appropriate path, such as path 534. The appropriate path can comprise an entire route or a single hop to a next fabric controller according to various embodiments. The fabric controller can identify an appropriate path based on any number of factors such as, but not limited to, traffic congestion, latencies, priorities, node and interconnect health, and so on. In some embodiments, respective fabric controllers maintain a map of the fabric attached architecture identifying various routes (e.g., shortest routes according to Dijkstra's algorithm) to various nodes in the fabric attached architecture and performance characteristics of each of those routes based on data retrieved at recurring intervals (e.g., data retrieved at every one-second interval) and comprising data such as, but not limited to, traffic congestion, fabric controller operability, distance, and so on. In some embodiments, the fabric controller 200 identifies at least a portion of an appropriate path based on iterative packet switching (e.g., [−1,+1] data packet switching based on the 4-tuple of data).

In operation 706, the fabric controller 200 sends the data packet to a next fabric controller identified in the appropriate path according to a virtual address associated with the next fabric controller as defined by a virtualized data-link layer. If the next fabric controller is a destination fabric controller, such as destination fabric controller 530, then the destination fabric controller will provide the payload of the data packet to the appropriate virtual machine via a hypervisor associated with the virtual machine together with any utility defined by the inner packet payload, such as inner packet payload 512, and supplied by the destination node, such as destination node 532.

Figure 8:
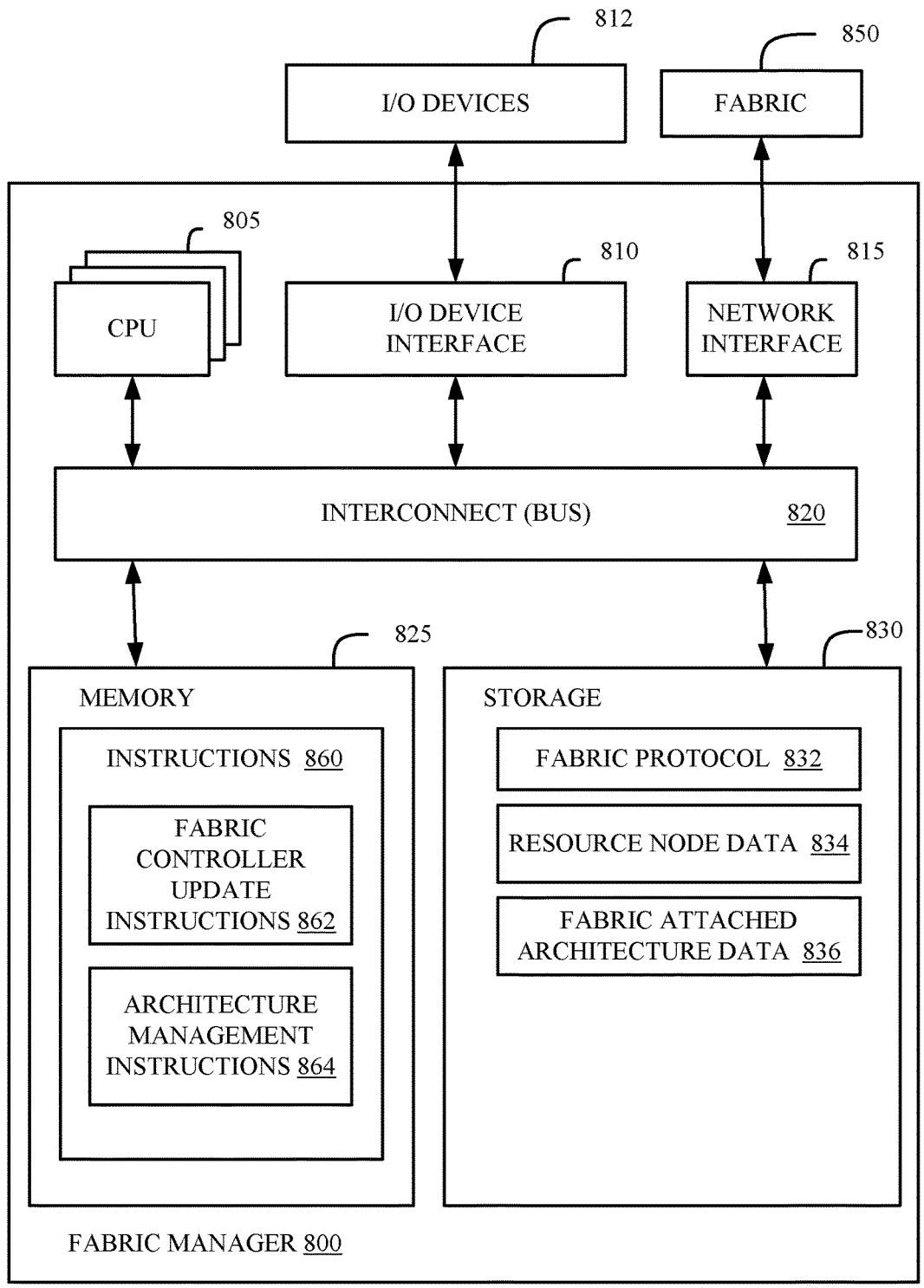
FIG. 8 illustrates a block diagram of an example fabric manager in accordance with some embodiments of the present disclosure.

FIG. 8 illustrates a block diagram of a fabric manager 800 in accordance with some embodiments of the present disclosure. Fabric manager 800 can interface with a fabric attached architecture 850 to update and manage the fabric attached architecture 850. Fabric manager 800 can be configured to install and/or update fabric controllers distributed throughout a fabric attached architecture with the necessary software, firmware, and/or protocols to successfully implement aspects of the present disclosure. In some embodiments, fabric manager 800 can be configured to display aspects of a fabric attached architecture 850 to a user (e.g., a system administrator) via a user interface (e.g., I/O devices 812) and modify aspects of the fabric attached architecture 850 responsive to user input (e.g., addition or removal of nodes, programming of data flows, segmentation, combination, or other modifications associated with virtual machines and/or hypervisors functioning on the fabric attached architecture 850, etc.).

The fabric manager 800 can include a memory 825, storage 830, an interconnect (e.g., BUS) 820, one or more processors 805 (also referred to as CPUs 805 herein), an I/O device interface 810, I/O devices 812, and a network interface 815.

Each CPU 805 retrieves and executes programming instructions stored in the memory 825 or storage 830. The interconnect 820 is used to move data, such as programming instructions, between the CPUs 805, I/O device interface 810, storage 830, network interface 815, and memory 825. The interconnect 820 can be implemented using one or more busses. The CPUs 805 can be a single CPU, multiple CPUs, or a single CPU having multiple processing cores in various embodiments. In some embodiments, a processor 805 can be a digital signal processor (DSP). Memory 825 is generally included to be representative of a random access memory (e.g., static random access memory (SRAM), dynamic random access memory (DRAM), or Flash). The storage 830 is generally included to be representative of a non-volatile memory, such as a hard disk drive, solid state device (SSD), removable memory cards, optical storage, or flash memory devices. In an alternative embodiment, the storage 830 can be replaced by storage area-network (SAN) devices, the cloud, or other devices connected to the data manager 800 via the I/O devices 810 or a fabric attached architecture 850 via the network interface 815.

In some embodiments, the memory 825 stores instructions 860 and the storage 830 stores fabric protocol 832, resource node data 834, and fabric attached architecture data 836. However, in various embodiments, the instructions 860, the fabric protocol 832, the resource node data 834, and the fabric attached architecture data 836 are stored partially in memory 825 and partially in storage 830, or they are stored entirely in memory 825 or entirely in storage 830, or they are accessed over a fabric attached architecture 850 via the network interface 815.

Fabric protocol 832 can comprise the protocol used by a fabric controller for interfacing with a resource node, controlling resources associated with the resource node, generating virtual addresses, providing resource capability information associated with the resource node to a fabric attached architecture, and/or transmitting data throughout the fabric attached architecture.

Resource node data 834 can comprise data (e.g., firmware) for successfully interfacing with a variety of types, families, generations, and/or versions of resource node products.

Fabric attached architecture data 836 comprises data related to the fabric attached architecture such as, but not limited to, performance characteristics (e.g., latencies, node health, and so on), numbers and types of resource nodes, numbers and types of virtual machines, numbers and types of instances, and so on.

The instructions 860 are processor executable instructions including fabric controller update instructions 862 and architecture management instructions 864. Fabric controller update instructions 862 can be executed by fabric manager 800 to install and/or update fabric protocol 832 and/or resource node data 834 on one or more fabric controllers distributed throughout a fabric attached architecture 850. Architecture management instructions 864 can be executed to retrieve fabric attached architecture data 836 and present the retrieved fabric attached architecture data 836 to a user interface via I/O devices 812. Architecture management instructions 864 can be further executed to implement changes to the fabric attached architecture 850 responsive to input received from one or more 110 devices 812 (e.g., programming data flows, etc.), as discussed in more detail below.

In various embodiments, the 110 devices 812 can include an interface capable of presenting information and receiving input. For example, 110 devices 812 can receive input from a user and present information to a user interacting with fabric manager 800. In some embodiments, fabric manager 800 is connected to the fabric attached architecture 850 via the network interface 815.

Figure 9:
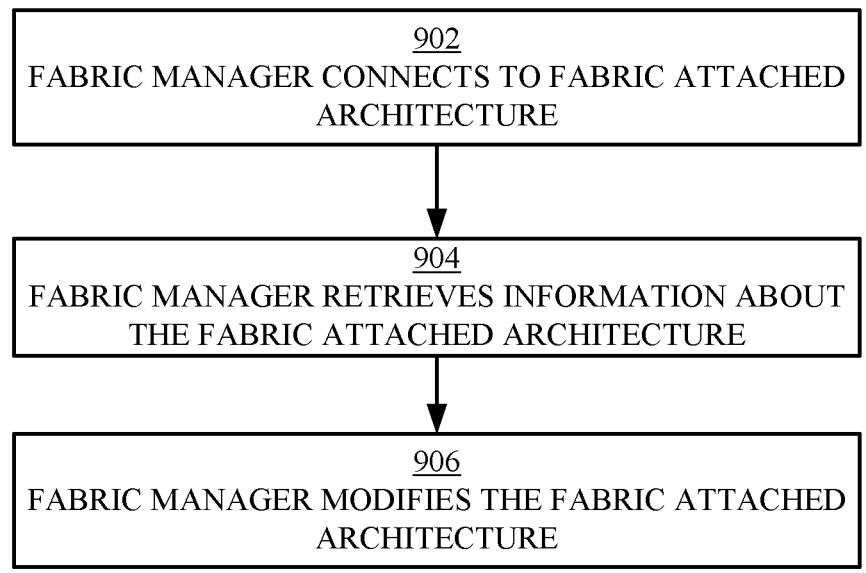
FIG. 9 illustrates an example flowchart for interfacing with a fabric attached architecture in accordance with some embodiments of the present disclosure.

FIG. 9 illustrates an example flowchart for interfacing with a fabric attached architecture in accordance with some embodiments of the present disclosure. In some embodiments, the method 900 is executed by a fabric manager (e.g., fabric manager 800 of FIG. 8). In some embodiments, the method 900 is performed by a processor executing computer readable instructions. For consistency, the method 900 will hereinafter be described as being performed by fabric manager 800, however, the method 900 can likewise be performed by other components or combinations of components communicatively coupled to a fabric attached architecture 850.

In operation 902, fabric manager 800 connects to the fabric attached architecture 850. In some embodiments, fabric manager 800 connects to the fabric attached architecture 850 by an Ethernet connection (e.g., a one gigabit Ethernet connection to a control plane management network of the fabric attached architecture 850).

In operation 904, fabric manager 800 retrieves information from the fabric attached architecture 850 such as, but not limited to, fabric attached architecture data 836. In operation 904, the fabric manager 800 can also retrieve data about different versions of fabric protocols and resource node firmware/software loaded on respective fabric controllers in the fabric attached architecture 850. In some embodiments, the fabric manager 800 displays the retrieved information to a user via a display (e.g., I/O devices 812).

In operation 906, the fabric manager 800 modifies the fabric attached architecture 850. In some embodiments, the fabric manager 800 modifies the fabric attached architecture 850 responsive to user input received at the fabric manager 800 and responsive to displaying information related to the fabric attached architecture 850 in operation 904.

In operation 906, the fabric manager 800 modifies the fabric attached architecture 850 by, for example, supplying updated resource node data 834 to one or more fabric controllers 200 (e.g., updated firmware for interfacing with respective resource nodes), supplying an updated fabric protocol 832 to one or more fabric controllers 200, supplying data flow logic to one or more fabric controllers 200 for intelligent processing of data packets 500, and/or supplying virtualization information for one or more virtual machines 522 to one or more fabric controllers 200.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
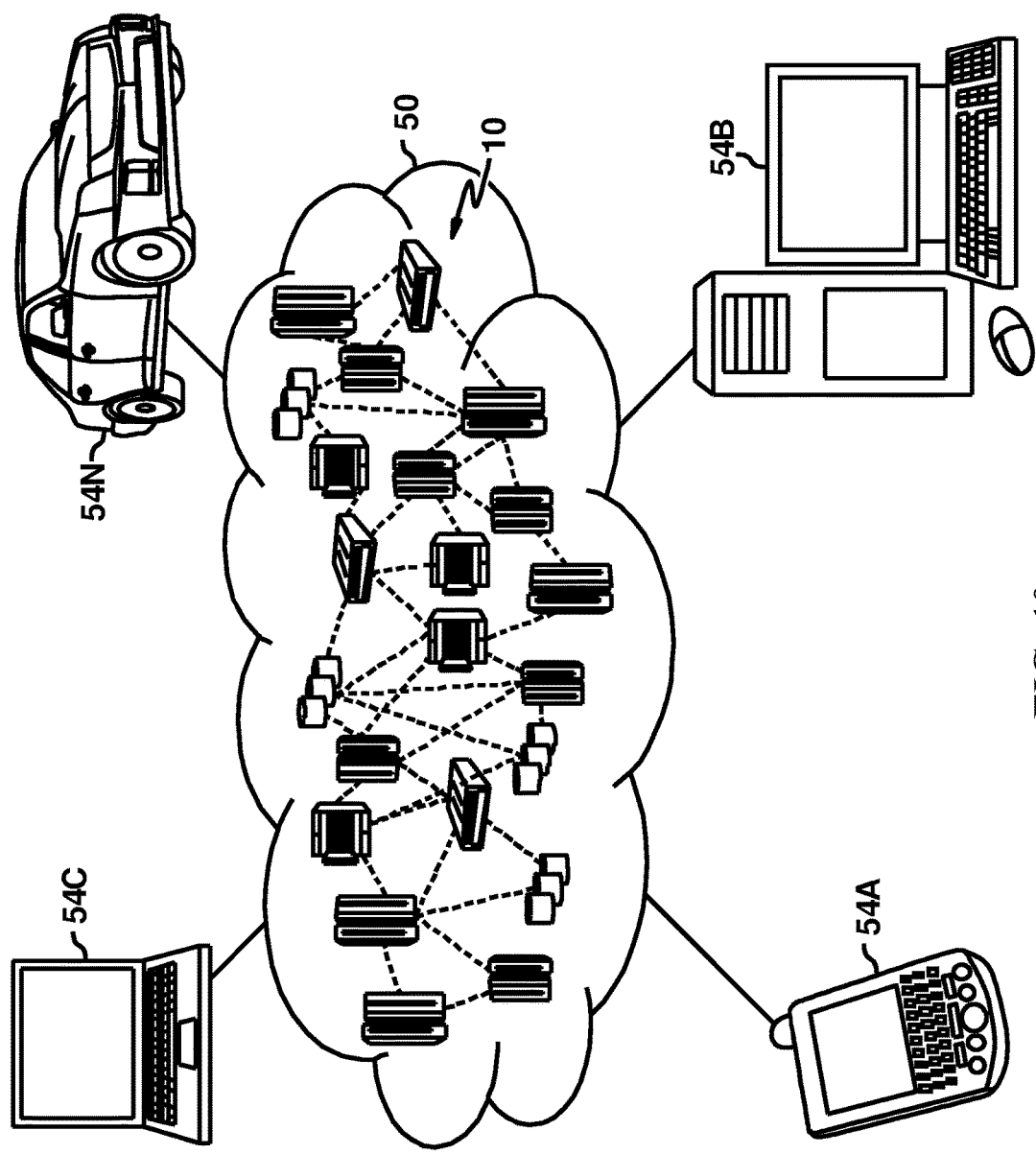
FIG. 10 depicts a cloud computing environment according to some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. In accordance with some embodiments of the present disclosure, nodes 10 can be physically interconnected by a plurality of fabric controllers to generate a fabric attached architecture. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 11:
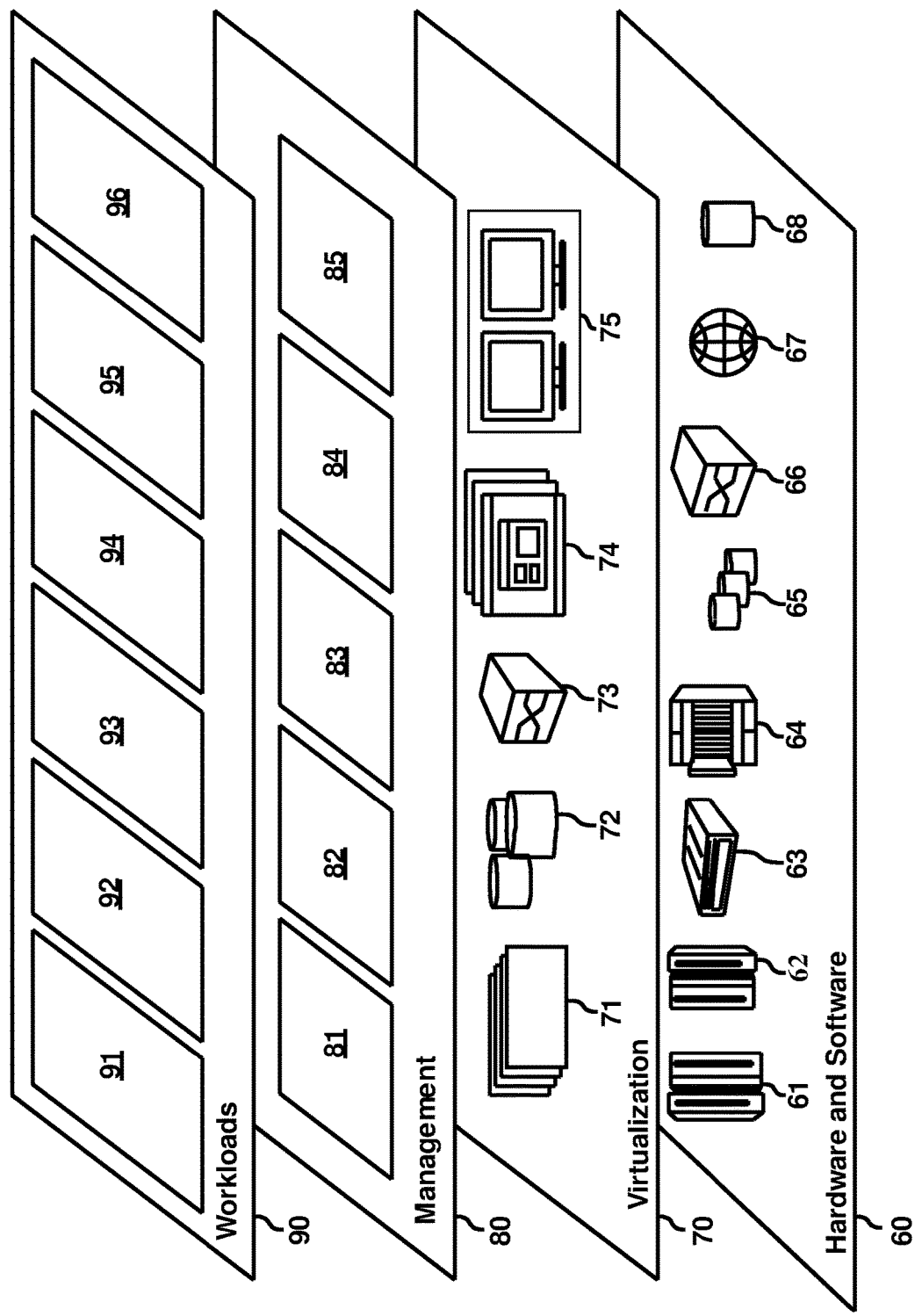
FIG. 11 depicts abstraction model layers according to some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, hardware and software layer 60 further includes a plurality of fabric controllers interfacing with and controlling respective portions of hardware and software layer 60.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
detecting a plurality of communicatively coupled resource nodes forming at least a portion of a fabric attached architecture, wherein respective resource nodes of the plurality of resource nodes comprise a respective baseboard management controller (BMC) and further comprise at least one of storage capability and compute capability, wherein the plurality of resource nodes are respectively coupled with a plurality of fabric controllers;
providing resource node capability information of a first resource associated with a first resource node of the plurality of resource nodes to the fabric attached architecture according to a fabric protocol responsive to a first fabric controller interfacing with the first resource node via a first BMC associated with the first resource node; and
utilizing the first resource in a virtual machine generated on the fabric attached architecture responsive to the first fabric controller issuing instructions associated with the virtual machine to the first resource node, wherein the instructions associated with the virtual machine comprises at least one data packet having a payload and a source address and a destination address, and wherein the first fabric controller has an address sequential to an address of the first resource node and comprising a data center identifier (ID), a rack ID, a chassis ID, and a fabric controller ID.

2. The method according to claim 1, wherein each fabric controller of the plurality of fabric controllers is physically connected to six other fabric controllers of the plurality of fabric controllers.

3. The method according to claim 2, wherein each physical connection comprises a 100 gigabit per second (GBPS) Ethernet connection.

4. The method according to claim 1, wherein each resource node of the plurality of resource nodes is associated with a respective fabric controller of a plurality of fabric controllers, wherein the number of fabric controllers is equal to the number of resource nodes.

5. The method according to claim 4, wherein the fabric attached architecture includes at least 5,000 resource nodes and at least 5,000 fabric controllers.

6. The method according to claim 1, wherein the plurality of resource nodes comprise at least a first subset of resource nodes comprising a first type of product configured to operate according to a first firmware and a second subset of resource nodes comprising a second type of product configured to operate according to a second firmware; and
wherein a respective fabric controller of the plurality of fabric controllers associated with a respective resource node of the first subset of resource nodes stores the first firmware, and wherein another fabric controller of the plurality of fabric controllers associated with a respective resource node of the second subset of resource nodes stores the second firmware.

7. A system comprising:
a plurality of resource nodes communicatively coupled to one another to form at least a portion of a fabric attached architecture, wherein respective resource nodes of the plurality of resource nodes have at least one of compute capability and data storage capability, wherein the plurality of resource nodes includes a first resource node comprising a baseboard management controller (BMC) and a first resource;
a plurality of fabric controllers respectively coupled to the plurality of resource nodes, the plurality of fabric controllers including a first fabric controller communicatively coupled to the BMC and comprising a fabric processor, a switch, and a storage, wherein the fabric processor executes instructions stored in the storage to interface with the first resource node via the BMC and provide resource capability information of the first resource via the switch to the fabric attached architecture according to a fabric protocol; and
wherein the fabric controller is configured to utilize the first resource by sending instructions to the first resource node in response to receiving virtual machine information from the fabric attached architecture via the switch, wherein the virtual machine information comprises at least one data packet having a payload and a source address and a destination address, and wherein the first fabric controller has an address sequential to an address of the first resource node and comprising a data center identifier (ID), a rack ID, a chassis ID, and a fabric controller ID.

8. The system according to claim 7, wherein the fabric attached architecture is configured for between 500 gigabit per second (GBPS) and 700 GBPS internode connectivity.

9. The system according to claim 7, wherein the first fabric controller is directly connected to six other fabric controllers of the plurality of fabric controllers.

10. The system according to claim 7, wherein respective resource nodes have one and only one of compute capability and storage capability.

11. The system according to claim 7, wherein the plurality of resource nodes comprises a number of resource nodes and wherein the plurality of fabric controllers comprises a number of fabric controllers, wherein the number of resource nodes is equal to the number of fabric controllers, and wherein resource nodes and fabric controllers are paired such that each pair comprises one respective resource node and one respective fabric controller.

12. A computer program product comprising a computer readable storage medium having program instructions embodied therewith, wherein the computer readable storage medium is not a transitory signal per se, the program instructions executable by a processor to cause the processor to perform a method comprising:
detecting, by a first fabric controller, a first resource node communicatively coupled to the first fabric controller, wherein the first resource node comprises a first baseboard management controller (BMC) and a first resource;
detecting, by the first fabric controller, a plurality of fabric controllers communicatively coupled to the first fabric controller and forming at least a portion of a fabric attached architecture, wherein respective fabric controllers of the plurality of fabric controllers are associated with respective resource nodes;
providing, by the first fabric controller, resource node capability information about the first resource to the fabric attached architecture according to a fabric protocol responsive to detecting the plurality of fabric controllers and interfacing with the first resource node via the first BMC; and utilizing the first resource by sending instructions to the first resource node responsive to receiving virtual machine information from the fabric attached architecture, wherein the virtual machine information comprises at least one data packet having a payload and a source address and a destination address, and wherein the first fabric controller has an address sequential to an address of the first resource node and comprising a data center identifier (ID), a rack ID, a chassis ID, and a fabric controller ID.

13. The computer program product according to claim 12, wherein each fabric controller of the plurality of fabric controllers is directly connected to six other fabric controllers by a connection rated for at least 100 gigabits per second.

14. The computer program product according to claim 12, wherein the program instructions are further configured to cause the processor to perform a method further comprising:

booting the first resource node on the fabric attached architecture responsive to detecting the plurality of fabric controllers and based on instructions received from the fabric attached architecture and transmitted to the first BMC by the first fabric controller.

* * * * *